(12) United States Patent
Aldridge et al.

(10) Patent No.: US 12,527,252 B2
(45) Date of Patent: Jan. 20, 2026

(54) BLADE CONTROL SYSTEM AND LAWNMOWER

(71) Applicant: Honda Motor Co., Ltd., Tokyo (JP)

(72) Inventors: Teegan L. Aldridge, Graham, NC (US); Vincent Andrew Prinzo, Cedar Grove, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 646 days.

(21) Appl. No.: 17/977,388

(22) Filed: Oct. 31, 2022

(65) Prior Publication Data

US 2024/0138293 A1 May 2, 2024

(51) Int. Cl.
*A01D 34/68* (2006.01)
*A01D 101/00* (2006.01)

(52) U.S. Cl.
CPC ...... *A01D 34/68* (2013.01); *A01D 2034/6843* (2013.01); *A01D 2101/00* (2013.01)

(58) Field of Classification Search
CPC .......................... A01D 34/68; A01D 2034/6843
See application file for complete search history.

(56) References Cited

U.S. PATENT DOCUMENTS

| | | |
|---|---|---|
| 4,327,539 A | 5/1982 | Bricko et al. |
| 4,753,062 A | 6/1988 | Roelle |
| 4,833,935 A | 5/1989 | Roelle |
| 4,936,160 A | 6/1990 | Barnard et al. |
| 5,203,147 A | 4/1993 | Long |
| 5,279,101 A | 1/1994 | Sueshige |
| 5,784,868 A | 7/1998 | Wadzinski et al. |
| 5,806,374 A * | 9/1998 | Mizutani ............ A01D 34/6806 74/483 PB |
| 6,047,614 A * | 4/2000 | Beugelsdyk ....... A01D 34/6806 74/489 |
| 6,078,015 A * | 6/2000 | Martinez ............ A01D 34/6818 200/332.2 |
| 6,170,241 B1 * | 1/2001 | Shibilski .............. H02H 7/0833 318/434 |
| 6,220,005 B1 * | 4/2001 | Plamper .................... H01H 3/20 56/10.8 |
| 6,609,357 B1 * | 8/2003 | Davis ................... A01D 34/006 701/25 |
| 7,762,049 B2 | 7/2010 | Eaton et al. |
| 7,850,555 B2 | 12/2010 | Keane et al. |
| 2009/0064649 A1 * | 3/2009 | Kaskawitz ......... A01D 34/6812 56/11.3 |
| 2012/0317949 A1 | 12/2012 | Abe et al. |
| 2013/0312566 A1 | 11/2013 | Shaffer |

* cited by examiner

*Primary Examiner* — Claude J Brown
(74) *Attorney, Agent, or Firm* — KENEALY VAIDYA LLP

(57) ABSTRACT

A blade control system for a walk-behind lawnmower, the blade control system can include a first actuator having a lever and a cam. The first actuator can be pivotably supported about a first axis and movable between a first position and a second position. An arm assembly can be pivotably supported about a second axis different than the first axis. The arm assembly can include a switch disposed on the arm assembly and configured to selectively output a first ON signal and a first OFF signal, wherein a biasing force acts on the cam and the arm assembly, and the arm assembly pivots about the second axis in a direction opposite to a direction the cam pivots about the first axis when the cam moves to the second position in an absence of the biasing force.

20 Claims, 14 Drawing Sheets

BLADE CONTROL SYSTEM AND LAWNMOWER

BACKGROUND

The disclosed subject matter relates to a lawnmower. More particularly, the disclosed subject matter relates to an apparatus that selectively activates and deactivates a power source that drives a blade of the lawnmower.

Lawnmowers can be powered by an internal combustion engine or by an electric motor or possibly even a hybrid of these two types of motor. The internal combustion engine or electric motor can be connected to one or more blades to rotate the blade(s) inside of a cutting chamber. Electric lawnmowers can rely on an external power source such as a wall outlet and can be connected to the wall outlet by an electrical cable (also referred to as an extension cord). Alternatively, electric lawnmowers can include an internal power supply such as a battery pack that includes one or more battery cells.

Lawnmowers can include a blade brake system that is mechanically, electrically, or electro-mechanically connected to the power source and/or the drive shaft of the blade(s) such that the blade brake system stops or prevents rotation of the blade(s) when the blade brake lever is in a first position and the power source drives the blade(s) when a blade brake lever is in a second position. The blade brake lever can be biased away from the second position and toward the first position so that the blade(s) rotate only when the operator grasps and holds the lever in the second position and the blade(s) stop rotating if the operator releases the blade brake lever. The blade brake lever and the second position can be configured so that the operator is located in an operator zone that is spaced away from the blade(s) when the operator holds the blade brake lever in the second position. For a walk-behind lawnmower, the operator zone can be behind the lawnmower, with the handle positioned between the operator and the cutting chamber. The blade brake lever and the second position can be configured such that the operator is unable to grasp and hold the blade brake lever in the second position when the operator is outside of the operator zone.

SUMMARY

Some embodiments are directed to a blade control system for a walk-behind lawnmower, the blade control system can include a first actuator having a lever and a cam, the first actuator pivotably supported about a first axis and movable between a first position and a second position, and an arm assembly pivotably supported about a second axis different than the first axis. The arm assembly can include, a switch disposed on the arm assembly and configured to selectively output a first ON signal and a first OFF signal, wherein a biasing force acts on the first actuator and the arm assembly. The arm assembly can pivot about the second axis in a direction opposite to a direction the cam pivots about the first axis when the cam moves to the second position in an absence of the biasing force.

According to another embodiment of the disclosed subject matter, a lawnmower can include a deck including a cutting chamber, a power source, a plurality of wheels supporting the deck, a blade rotatably supported in the cutting chamber and selectively driven by the power source, and a blade control assembly. The blade control assembly can include, a first actuator having a lever and a cam, the first actuator pivotably supported about a first axis and movable between a first position and a second position, and an arm assembly pivotably supported about a second axis different than the first axis. The arm assembly can include a switch disposed on the arm assembly and configured to selectively output a first ON signal and a first OFF signal, wherein an elastic member can be connected between the first actuator and the arm assembly and configured to provide a biasing force against both the first actuator and the arm assembly. The arm assembly can be configured to pivot about the second axis in a direction opposite to a direction the cam pivots about the first axis when the cam moves to the second position in an absence of the biasing force.

According to yet another embodiment of the disclosed subject matter, a blade control system for a walk-behind lawnmower can include a first actuator having a cam, the first actuator pivotably supported about a first axis, an arm assembly pivotably supported about a second axis different than the first axis. The arm assembly can include a switch disposed on the arm assembly and configured to selectively output a first ON signal and a first OFF signal, a spring that connects the first actuator to the arm assembly and, in a first state, exerts a bias force on the arm assembly in a first direction about the second axis, wherein the arm assembly pivots about the second axis in a second direction different from the first direction and when, in a second state, there is an absence of the bias force from the spring, the cam contacts the arm assembly without causing the switch to output the ON signal.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
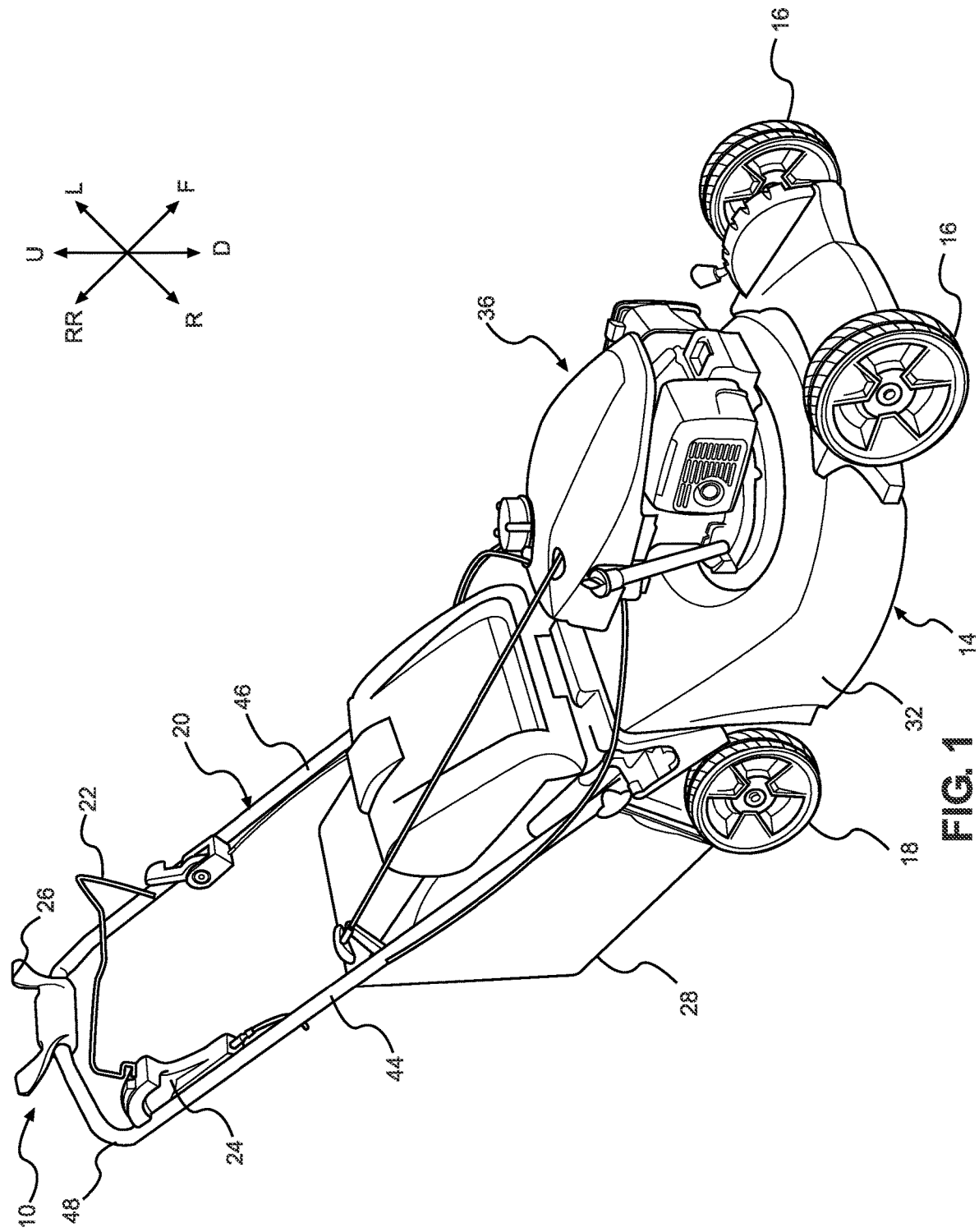
FIG. 1 is a perspective view of a lawnmower including a blade control system made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Any appropriate elastically deformable structure such as, but not limited to, a spring can be used to bias a blade brake lever away from a blade operating position and toward a blade brake position. The lawnmower can be operated along uneven or bumpy terrain that can cause the elastic biasing structure to malfunction or shift its position such that the blade brake lever is not biased away from the blade operating position. Further, improper usage and/or insufficient maintenance can damage the elastic biasing structure in such a way that impairs or prevents the elastic biasing structure from biasing the blade brake lever away from the blade operating position. Thus, in some conventional lawnmower blade brake devices, if the spring is not maintained or is used improperly, and fails, it is possible under certain misuse conditions for the blade to rotate when the operator is outside of the operator zone.

Accordingly, there is a need for a lawnmower that can enhance the ability of a blade control system to maintain the blade(s) in the stopped or brake state if there is damage to or a malfunction of the blade control system. In normal operation, a switch can be activated to start and rotate the blade(s). According to an embodiment, a spring can be configured to push an arm lever within range of a cam that contacts the switch for activation of the blade(s). In a mechanical failure (spring disconnected from the arm with the switch), the switch cannot be activated because there is no force holding the arm lever and switch against the cam. If the cam comes into contact with the switch, in this condition, the arm and switch will be pushed away without switch activation which creates a "no run" condition until the switch and its components (spring) are repaired. Thus, the spring can act to bias the handle or lever of the brake system to a blade brake position while also biasing a blade operation switch towards an actuation cam. Thus, failure of the spring results in the handle or lever of the blade brake system able rotate to any position without bias to a particular position, while also not causing actuation of the switch when the handle or lever is in any position in this state.

The blade control system for a lawnmower having a spring/arm and cam mechanism can be configured such that the blade control system does not allow the user to restart the blades during a mechanical failure condition.

The lawnmower can be operated by using two separate and dissimilar actions i.e., pressing a wake button followed by bail rotation against the lawnmower handle. When the user lets go of the button or the bail, they both return to "blade off" position because of springs.

In the spring/arm mechanism of the lawnmower, switches can be installed on the arm and can be activated because the spring is pushing the arm (which holds the switches) within range of the cam.

In case of any failure, such as spring failure or misalignment, the switches cannot be activated because there is no force holding the arm and switches toward the cam. If the cam comes into contact with the switches, in this condition, the arm and switches will be pushed away without switch activation (which creates a "no run" condition).

FIG. 1 is a perspective view of a lawnmower 10 made in accordance with principles of the disclosed subject matter. The lawnmower 10 can include a blade control system 12, a blade 30 (see FIG. 13), and a power source 36. The blade control system 12 can be configured to control rotation of the blade 30. The power source 36 can be configured as an internal combustion engine, as shown by the lawnmower 10 of FIG. 1 or, alternatively, as an electric motor with a power supply 38, as shown by the lawnmower 210 of FIG. 14.

The blade control system 12 can include a controller 40 (also referred to as an electronic control unit ("ECU") or a central processing unit ("CPU")) and a pair of switches 50, 52 that can be configured to electrically signal the controller 40 whether a bail lever 22 (also referred to as a bail lever, blade brake lever or an operator presence lever) is in a first position (also referred to as a blade stopped or blade brake position) and a second position (also referred to as a blade rotation position or a blade operating position). In turn, the controller 40 can be configured to output a control signal to one or more appropriate devices such as, but not limited to, a clutch and brake assembly of the first lawnmower 10 or an electric motor of the second lawnmower 210 to stop or permit rotation of the blade 30.

Each of the lawnmowers 10, 210 can include a deck 14, a pair of front wheels 16, a pair of rear wheels 18 (the left rear wheel is obstructed from view in FIG. 1 by the deck 14) a handle 20, a second control assembly 26 and a collection bag 28. The handle 20, second input control assembly 26 and collection bag 28 are omitted from FIG. 14 for simplicity and clarity of the drawing. The deck 14 can also be referred to as a mower deck or as a cutter deck or as a cutter housing. The second input assembly 26 can be configured to allow the operator to control the speed at which the lawnmower 10 propels itself across the terrain.

Figure 2:
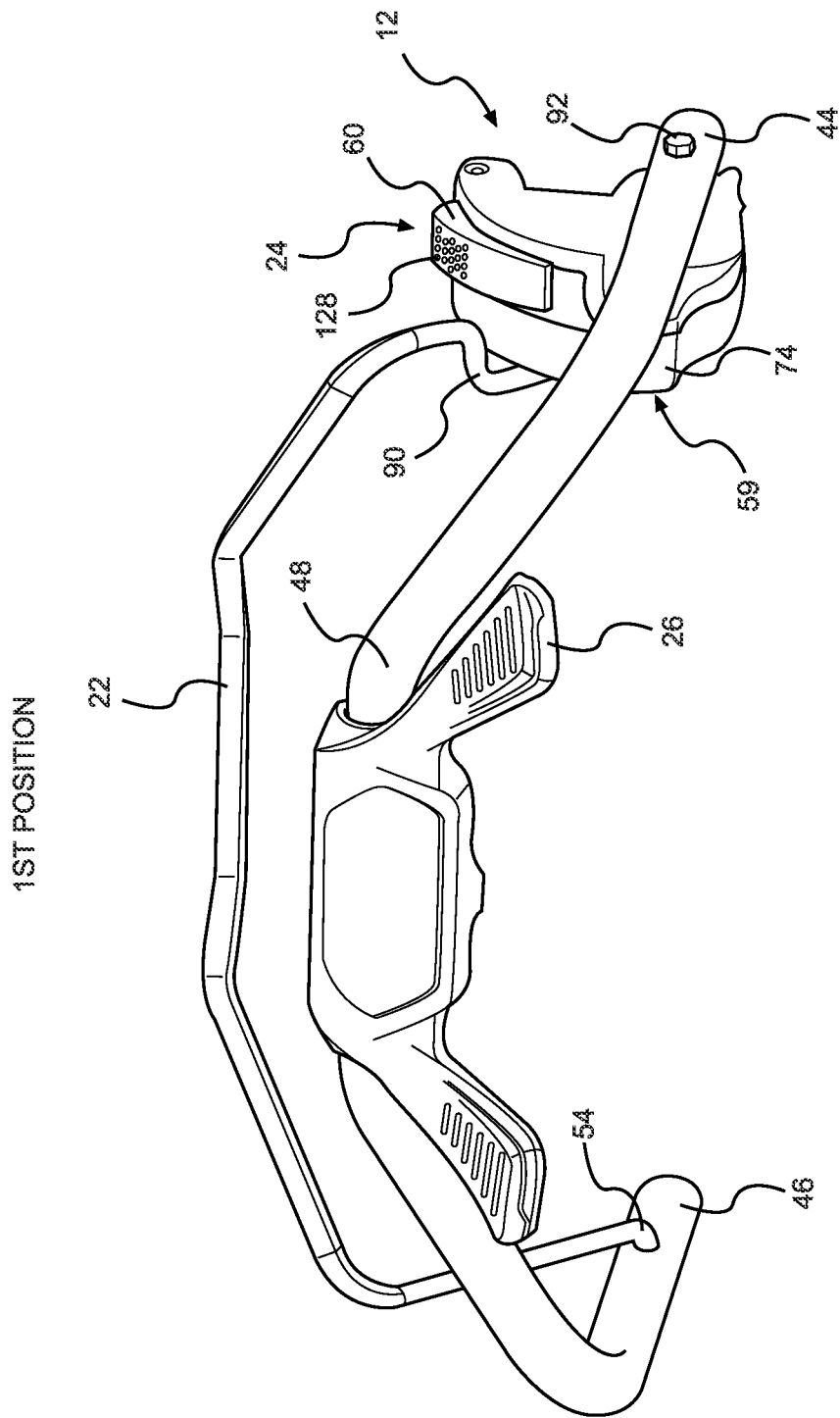
FIG. 2 is a perspective view of a handle and a detection portion of the blade control system made in accordance with principles of the disclosed subject matter.

Referring to FIGS. 1 and 2, the blade control system 12 can include the bail lever 22 and a first input control assembly 24.

A user of the lawnmowers 10, 210 can grasp the handle 20 in order to guide the path of travel of the lawnmowers 10, 210. The handle 20 can include a right extension 44, a left extension 46 and a U-shaped portion 48 that connects to and extends from each of the extensions 44, 46. The handle 20 can support the bail lever 22, the first input control assembly 24 and the second input control assembly 26.

The bail lever 22 can be pivotally mounted on the handle 20. The bail lever 22 can also be configured to selectively permit the power source 36 to drive the blade 30 and stop rotation of the blade 30. When in the first position shown in FIGS. 1 and 2, the bail lever 22 can prevent or stop rotation of the blade 30. When pivoted toward the U-shaped portion 48 and held in the second position shown in FIG. 3, the bail lever 22 can permit the power source 36 to rotate the blade 30.

The first input control assembly 24 can be mounted on the handle 20 in any appropriate position and orientation on the handle 20 that can facilitate interaction with a user of the lawnmower 10. In the exemplary embodiment of FIG. 1, the first input control assembly 24 can be mounted on the upper portion of the right extension 44 of the handle 20. The first input control assembly 24 can be configured to actuate one or more operational features of the lawnmower 10. In one exemplary embodiment, the first input control assembly 24 can be configured to cooperate with the bail lever 22 in order to signal the controller 40 to transition from the sleep mode to the operational mode and to signal the controller 40 to drive or stop rotation of the blade 30 via the power source 36. The first input control assembly 24 can include the switches 50, 52.

The second input control assembly 26 can be mounted on the handle 20 in any appropriate position and orientation on the handle 20 that can facilitate interaction with a user of the lawnmower 10. In the exemplary embodiment of FIGS. 1-5, the second input control assembly 26 can be mounted on the U-shaped portion 48 of the handle 20. In an exemplary embodiment, the second input control assembly 26 can include a switch, lever or knob configured to selectively electrically (or mechanically) connect a self-propulsion assembly to the power source 36. The self-propulsion assembly can apply torque to at least one of the rear wheels 18. The second input control system 26 can be configured to adjust the speed at which the self-propulsion assembly propels the lawnmower 10 along the ground. The self-propulsion system can be driven by the power source 36 or by a separate power source, such as but not limited to an electric motor or a hydrostatic drive assembly or a geartrain.

Referring to FIGS. 2-5 collectively, the bail lever 22 can include a left end 54 and a right end 56. The left end 54 can be connected to and rotatably supported by the left extension 46 of the handle 20. The right end 56 can be connected to and rotatably supported by the first input control assembly 24.

Referring to FIGS. 3-10 collectively, the first input control assembly 24 can include the wake switch 50, the blade switch 52, a case 59, a wake actuator 60, a cam member 62, a first coil spring 64, a second coil spring 66 (or other elastic member), and an arm assembly 67. The bail lever 22 and the cam member 62 can be collectively referred to as a blade brake actuator 22, 62. The case 59 can also be referred to as a housing or as a switch housing. The case 59 can include a first case member 68 and a second case member 70.

Figure 3:
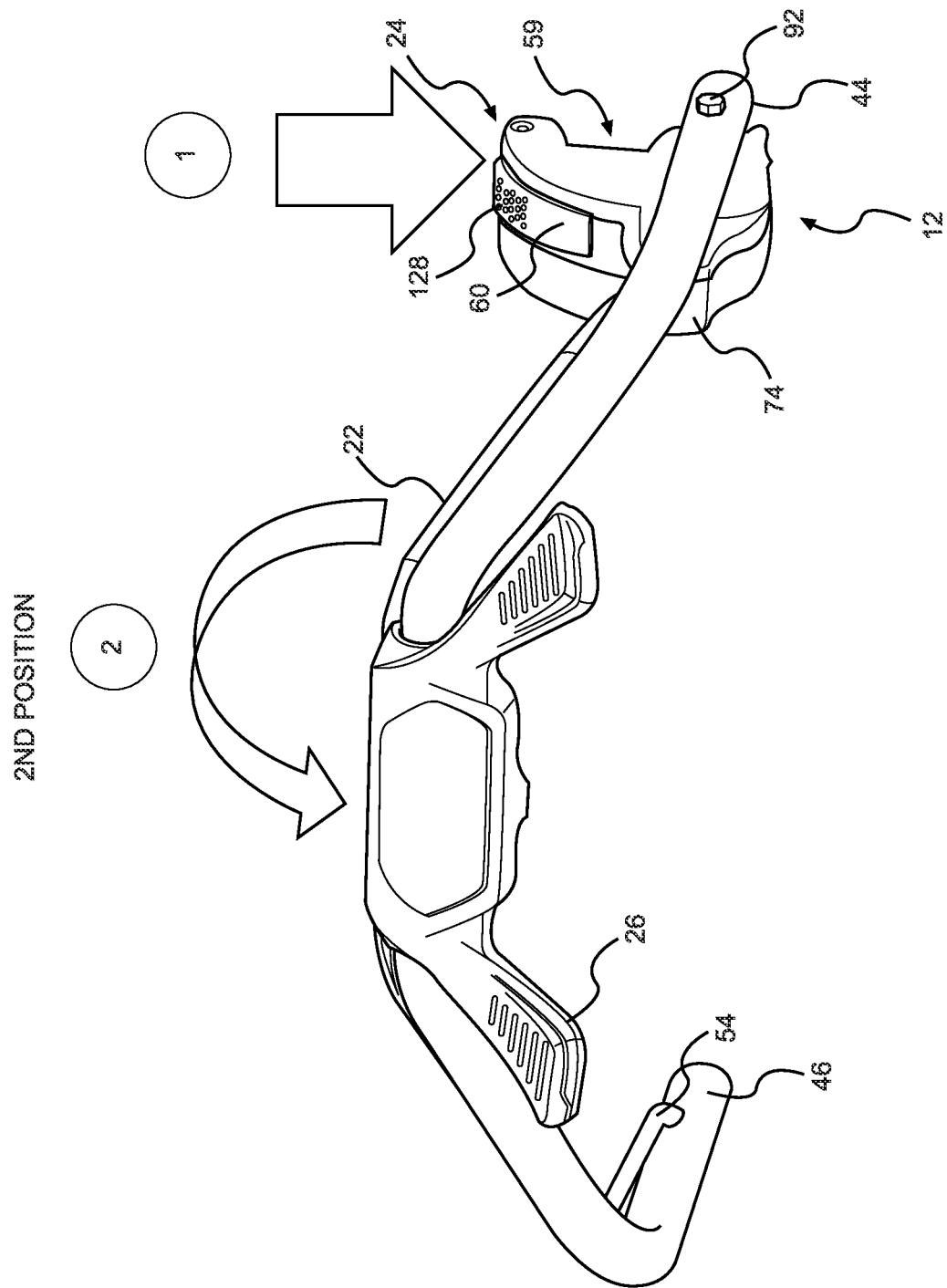
FIG. 3 is a perspective view of a wake actuator and a blade brake actuator of the blade control system of FIG. 2 in their respective second position.
Figure 4:
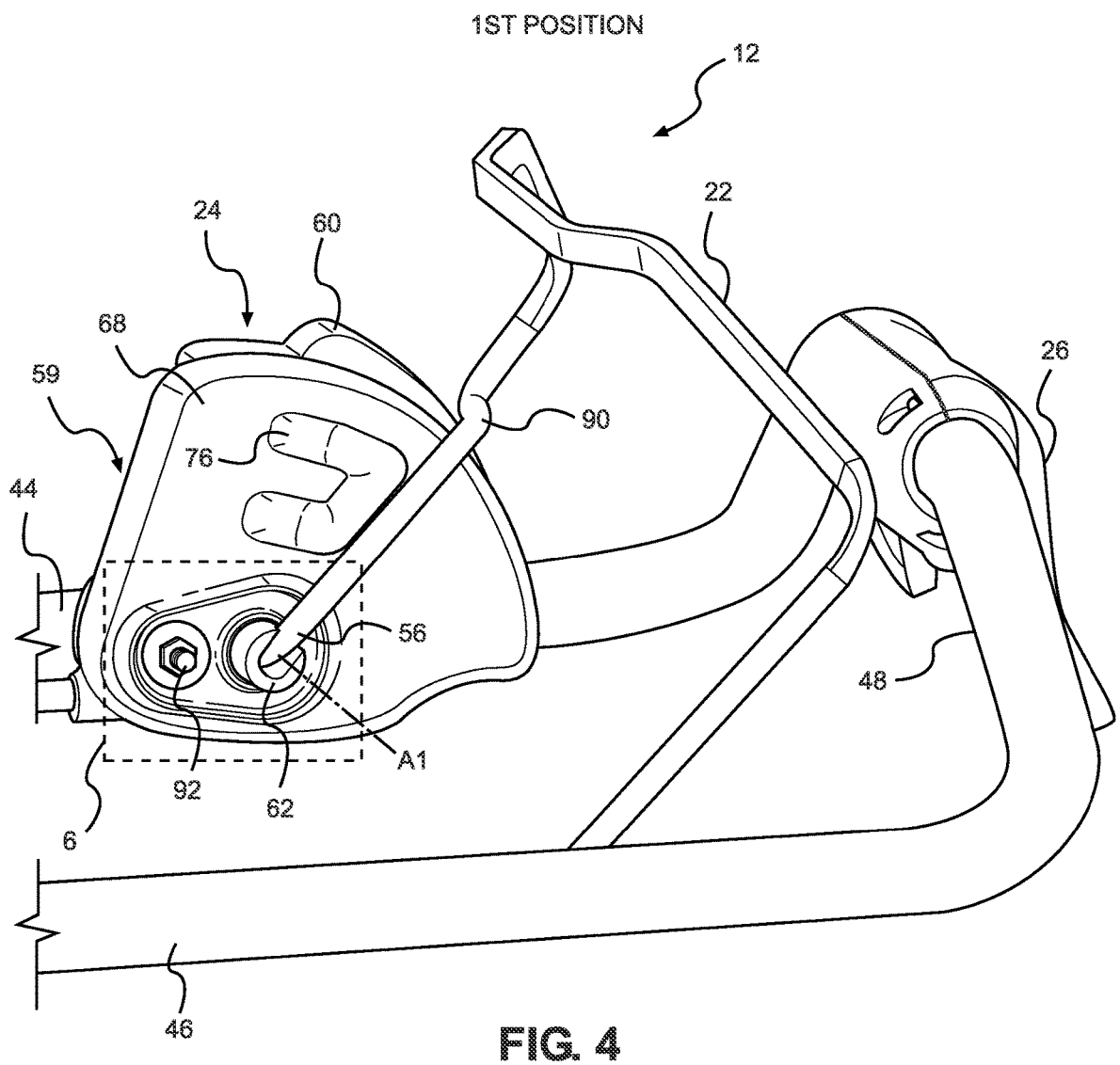
FIG. 4 is a side view of the handle and the portion of the blade control system of FIG. 2 with the wake actuator and the blade brake actuator in their respective first position.
Figure 5:
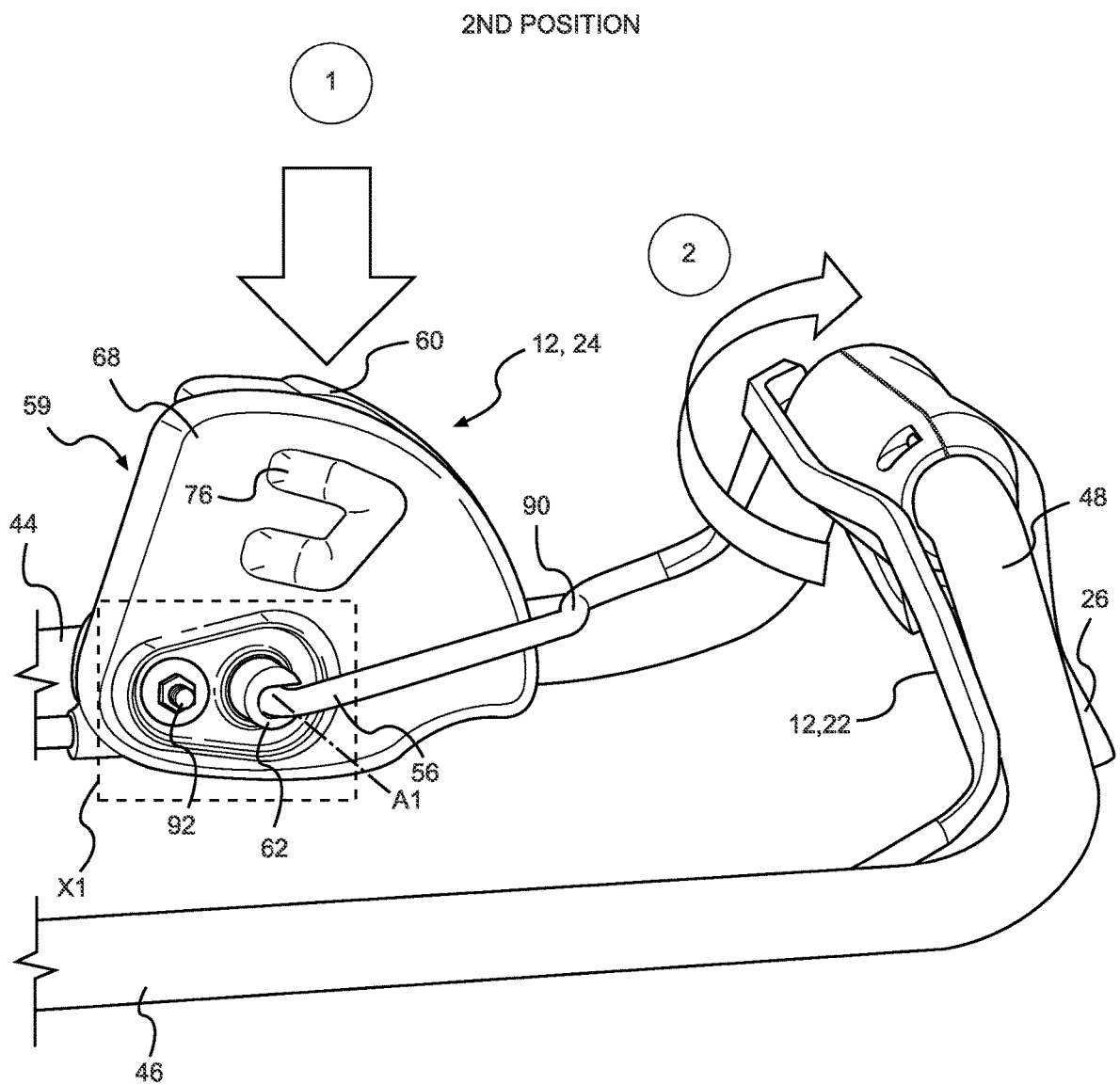
FIG. 5 is a side view of the handle and the portion of the blade control system of FIG. 2 with the wake actuator and the blade brake actuator in their respective second position.

The case 59 can contain the switches 50, 52, and the springs 64, 66 in an interior cavity formed by and between the housing members 68, 70. The case 59 can be configured to movably support the wake actuator 60 and the blade brake actuator 22, 62 between respective first positions and second positions. FIGS. 2 and 4 show the wake actuator 60 and the blade brake actuator 22, 62 in the respective first positions. FIGS. 3 and 5 show the wake actuator 60 and the blade brake actuator 22, 62 in the respective second positions. The first coil spring 64 can bias the wake actuator 60 toward and into the first position. The second spring 66 can bias the blade brake actuator 22, 62 toward and into the respective first position.

The wake switch 50 can be configured to selectively transmit a wake signal or a normal signal to the controller 40 based on the position of the wake actuator 60. The wake switch 50 can be configured to transmit the normal signal when the wake actuator 60 is in the first position. The wake switch 50 can be configured to transmit the wake signal when the wake actuator 60 is in the second position. The controller 40 can be configured to remain in the sleep mode when the controller 40 receives the normal signal from the wake switch 50. The controller 40 can be configured to transition from the sleep mode to the operational mode when the controller 40 receives the wake signal. The wake signal can be referred to as an ON signal and the normal signal can be referred to as an OFF signal.

The blade switch 52 can be configured to selectively transmit a run signal or a normal signal to the controller 40 based on the position of the blade brake actuator 22, 62. The blade switch 52 can be configured to transmit the normal signal when the blade brake actuator 22, 62 is in the first position. The blade switch 52 can be configured to transmit the run signal when the blade brake actuator 22, 62 is in the second position. The controller 40 can be configured to transition the power source 36 to an idle state by disconnecting blade 30 from the power source 36 and stopping the blade 30, or maintain the idle state of the power source 36 and the stopped state of the blade 30, when the controller 40 receives the normal signal from the blade switch 52. The controller 40 can be configured to transition the power source 36 to a drive state by connecting the blade 30 to the power source 36 so that the power source 36 drives the blade 30 when the controller 40 receives the run signal under the conditions described below. The run signal can also be referred to as an ON signal and the normal signal can be referred to as an OFF signal.

A user of the lawnmower 10 can signal the controller 40 to transition from the sleep mode to the operational mode by moving the wake actuator 60 to the first position. The user of the lawnmower 10 can signal the controller 40 to start rotation of the stopped blade 30 by moving the blade brake actuator 22,62 to the second position while holding the wake actuator 60 in the second position. The user of the lawnmower 10 can signal the controller 40 to stop operation of the lawnmower 10 and transition from the operational mode to the sleep mode by releasing the blade brake actuator 22, 62. As a result, the second coil spring 66 can move the blade brake actuator 22, 62 to the first position. When a user has released the blade brake actuator 22, 62, the controller 40 can be configured to signal the power source 36 to stop rotation of the blade 30 and/or disconnect blade 30 from the power source 36. Further, controller 40 can be configured to transition from the operational mode to the sleep mode after the user has released at least the blade brake actuator 22, 62.

Figure 6:
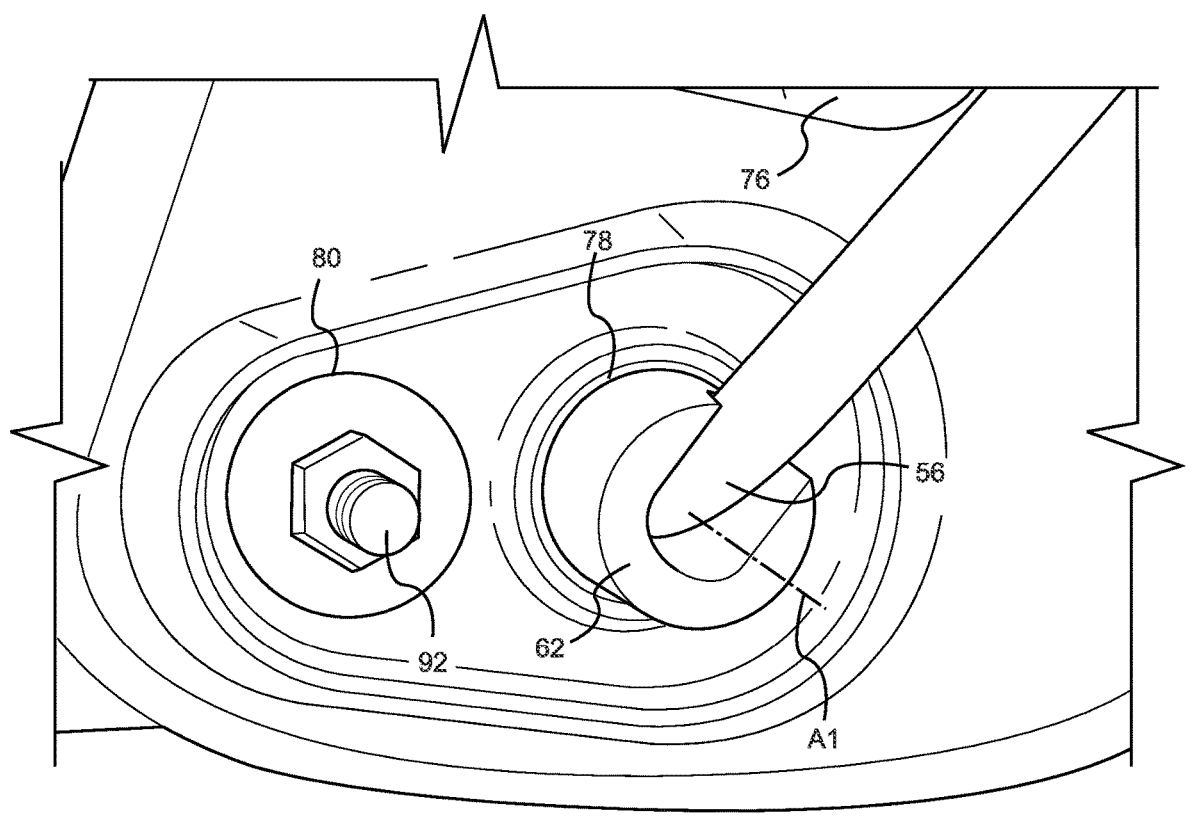
FIG. 6 is an enlarged view of a portion of FIG. 4.

FIG. 6 is an enlarged view of the boxed area 6 of FIG. 4 and shows the right end of the bail lever 22 and the cam member 62 when the blade brake actuator 22, 62 is in the first position as shown in FIG. 4. In the first position, the bias force from the second coil spring 66 pushes the cam member 62 such that the bail lever 22 is rotated away from the U-shaped portion 48 of the handle 20 and toward the lever stop 76 of the first case member 68. The bail lever 22 rotates about first axis A1 as shown in the figures.

Figure 7:
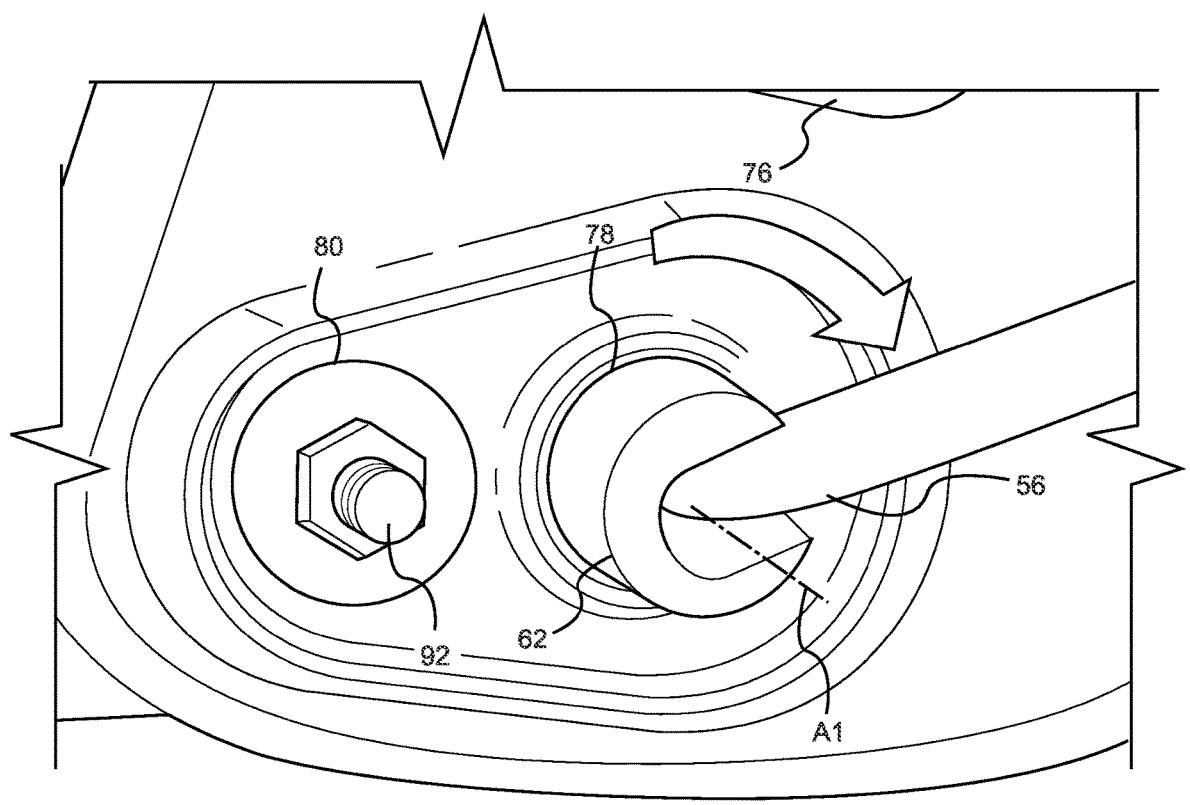
FIG. 7 is an enlarged view of a portion of FIG. 5.

FIG. 7 shows an enhanced view of the right end of the bail lever 22 and the cam member 62 when the blade brake actuator 22, 62 is in the second position as shown in FIG. 5. In the second position, the operator can exert a force on the bail lever 22 sufficient to overcome the bias force from the second coil spring 66 such that the bail lever 22 rotates away from the lever stop 76 and toward the u-shaped portion 48 of the handle while also rotating the cam member 62.

Figure 8:
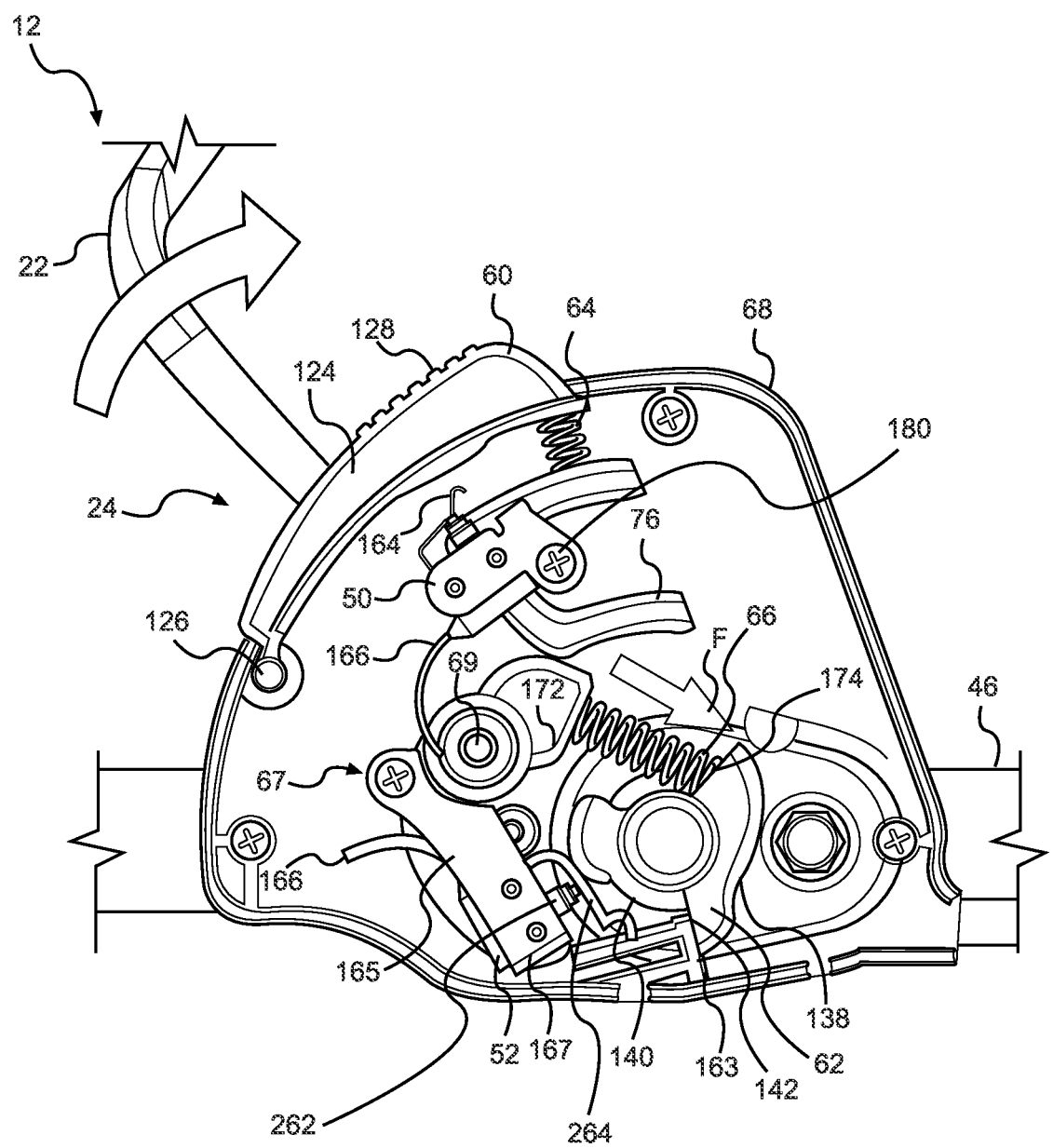
FIG. 8 is an enlarged side view of the blade control system of the lawnmower of FIG. 2 with the second case member removed and showing the wake actuator and the blade brake actuator in their respective first position.

Referring to FIG. 8, there is illustrated a side view of the case 59, having second case member 70 removed, with internal components therein when the wake actuator 60 and the blade brake actuator 22, 62 are in their respective first position as shown in FIG. 4. Within the case 59, there is the wake switch 50, the blade switch 52, the arm assembly 67, the cam member 62, the first coil spring 64, and the second coil spring 66.

The wake switch 50 is mounted to the first case member 68 via fastener 180. Arm assembly 67 is rotatably mounted within the case 59 about dowel 69 such that the arm assembly 67 is rotatable about a second axis A2. Arm assembly 67 includes an arm lever 165 and a first seat 172. Arm assembly 67 can form a substantially c-shaped structure having the blade switch 52 fixed to an end 167 of the arm lever 165 and the first seat 172 can be attached to the second coil spring 66.

The cam member 62 is rotatably mounted within the case 59 about a second bearing 100 and attached to right end 56 of bail lever 22. Cam member 62 can include a second seat 174 to which the second coil spring 66 is attached. In the first position shown in FIG. 8, the abutment surface 142 of cam member 62 abuts against a wall abutment surface 163 (also referred to as a stop) of the first case member 68.

The cam member 62 can include a main surface 138, a recessed surface 140, an abutment surface 142 and a camming surface 144. The main surface 138 can be a substantially cylindrical surface that extends from and between the second seat 174 to the camming surface 144 in a circumferential direction of the cam member 62. The recessed surface 140 can extend from and between each of the abutment surface 142 and the camming surface 144 as well as the camming surface 144 and the second seat 174. The main surface 138 and the recessed surface 140 can be concentric substantially cylindrical surfaces such that the radius of the recessed surface 140 is less than the radius of the main surface 138. The camming surface 144 can be a curved surface that provides a smooth transition to and from the recessed surface.

The second coil spring 66 can be disposed between arm assembly 67 and cam member 62 so as to exert a spring bias force F that predisposes the cam member 62 to rotate the bail lever 22 to its first position.

Figure 9:
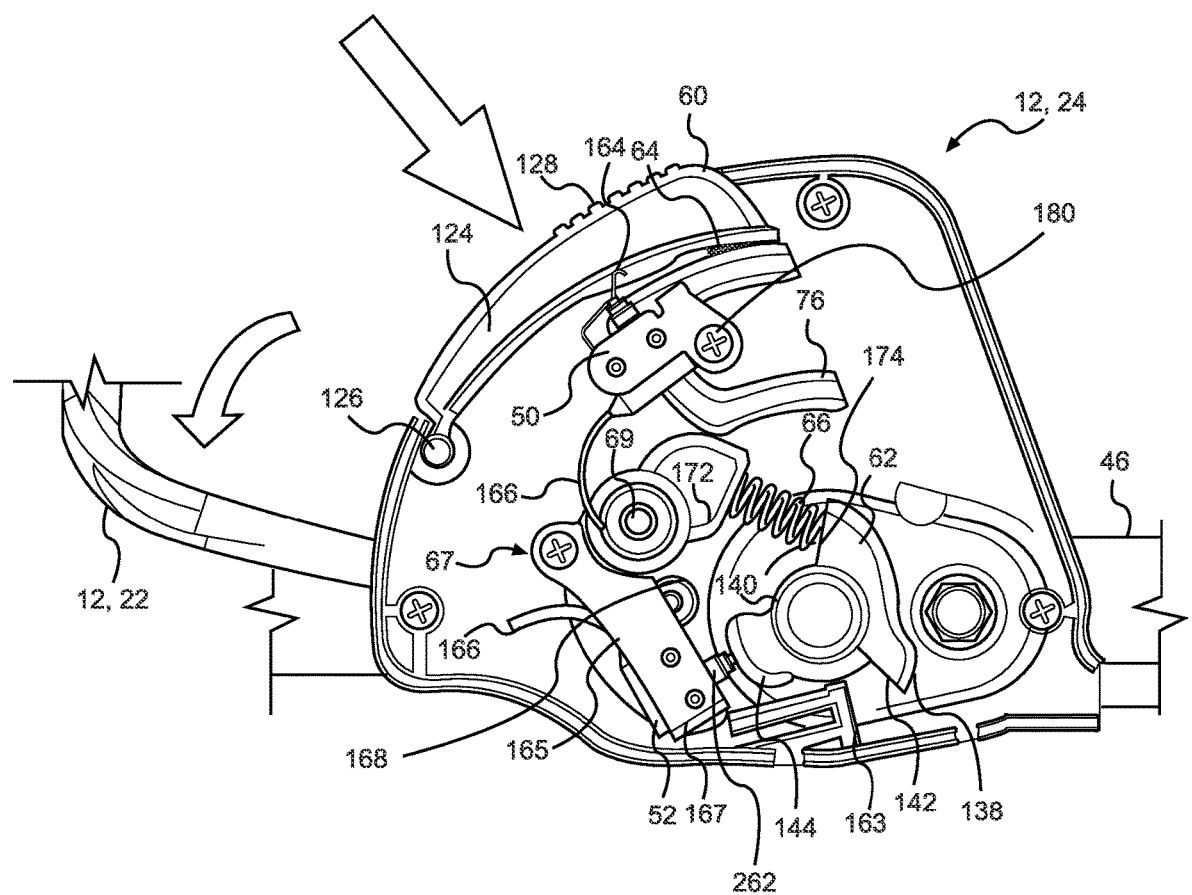
FIG. 9 is an enlarged side view of a portion of the blade control system of the lawnmower of FIG. 2 with the second case member removed and shows the wake actuator and the blade brake actuator in their respective second position.

Referring to FIG. 9, there is illustrated a side view of the case 59, having second case member 70 removed, with internal components therein when the wake actuator 60 and the blade brake actuator 22, 62 are in their respective second position as shown in FIG. 5. In the second position shown in FIG. 9, the abutment surface 142 of cam member 62 is spaced away from the wall abutment surface 163 of the first case member 68.

When the wake actuator 60 is in its second position, the engagement surface 130 can contact the lever 164 of the wake switch 50. The lever 164 can be effectively an extension of the push button 162. The lever 164 can be secured to the housing 154 in any appropriate manner. The lever 164 can continuously engage the push button 162. The lever 164 can be elastically deformed when the wake actuator applies a force to the lever 164. However, as shown in FIG. 9, the lever 264 can be omitted from the blade switch 52 (and/or wake switch 50), and the push button 162, 262 can include a spring or elastic member therein for actuation.

The cam member 62 can be oriented relative to the blade switch 52 such that the camming surface 144 engages the push button 162 when the blade brake actuator 22, 62 is in the second position, and such that the recessed surface 140 opposes and is spaced away from the push button 162 when the blade brake actuator 22, 62 is spaced away from the second position. FIG. 8 shows the blade brake actuator 22, 62 in the first position and FIG. 9 shows the brake actuator 22, 62 in the second position.

The camming surface 144 can be configured to selectively apply a force to the push button 162 of the blade brake switch 52. When the blade brake actuator 22, 62 is in the first position, the camming surface 144 can be spaced away from the push button 162 such that the blade brake switch 52 connects the normally closed terminal 160 to the common terminal 156 and the PDU 40 receives the normal (OFF) signal from the blade brake switch 52. FIG. 8 shows the blade brake actuator 22, 62 in the first position. When a user moves the blade brake actuator 22, 62 to the second position, the camming surface 144 can apply a force to the push button 162 such that the blade brake switch 52 connects the normally opened terminal 158 to the common terminal 156 and the PDU 40 receives the run (ON) signal from the wake switch 50. FIG. 9 shows the blade brake actuator 22, 62 in the second position.

Figure 10:
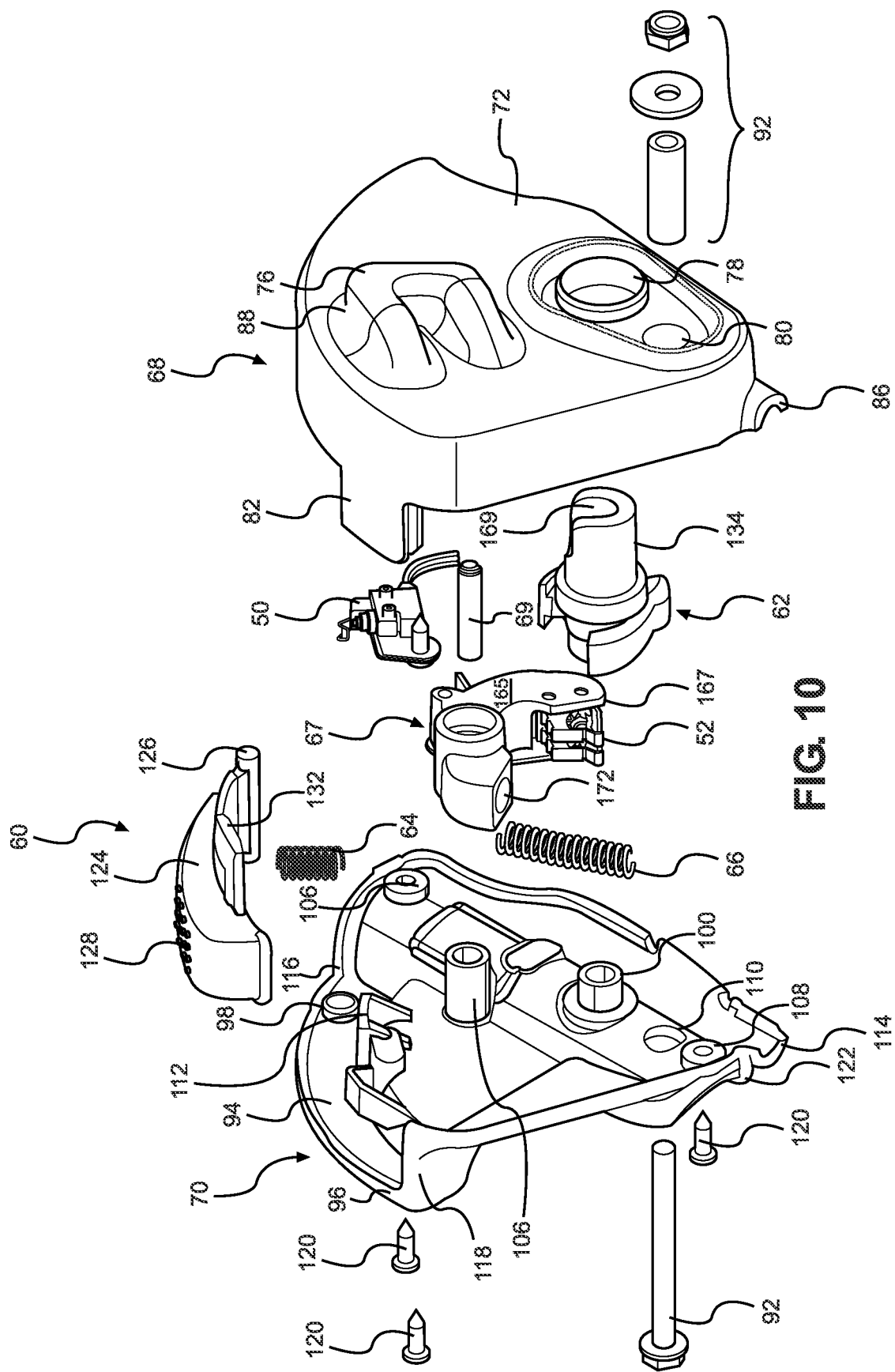
FIG. 10 is an exploded perspective view of the blade control system of FIG. 2.

Referring to FIG. 10, the first case member 68 can include a main wall 72, a peripheral wall 74, a lever stop 76, a bearing 78, a mounting hole 80, an upper projection 82, a lower projection 84 and outlet projection 86. (The lower projection 84 is obstructed from view in view FIG. 10 by the main wall 72).

The main wall 72 can oppose the second case member 70. The peripheral wall 74 can project from the main wall 72 toward the second case member 70 and can surround the main wall 72. The peripheral wall 74 can be perpendicular or substantially perpendicular to the main wall 72 such that one skilled in the art would perceive the walls 72, 74 as being perpendicular to each other.

The lever stop 76 can extend away from an exterior surface of the main wall 72 in a direction toward the bail lever 22. The lever stop 76 can include an end wall 88 that the bail lever 22 abuts when the bail lever 22 is in the first position. The bail lever 22 can include a bend 90. A portion of the bail lever 22 that is between the right end 56 and the bend 90 can abut the end wall 88 when the bail lever 22 is in the first position.

Referring to FIG. 10, the bearing 78 can rotatably support the cam member 62. The bearing 78 can include a cylindrical bearing surface that surrounds a hole that passes through the main wall 72. The bearing 78 can rotationally support the cam member 62 as the blade brake actuator 22, 62 moves between the first and second positions.

The mounting hole 80 can pass through the main wall 72. The mounting hole 80 and can cooperate with a mounting fastener 92 to secure the case 59 to the right extension 44 of the handle 22.

Referring to FIGS. 2 and 10 collectively, an upper projection 82 and a lower projection can be connected to and extend away from the peripheral wall 74 and abut the second case member 70. The lower projection can be similarly shaped and spaced away from the upper projection 82 along the extent of the peripheral wall 74. The wake actuator 60 can be received in the space between the upper projection 82 and the lower projection 84. The wake actuator 60 can extend into and out of the case 59 at this space. The wake actuator 60 can move through the space as the wake actuator 60 moves between the first and second positions.

The outlet projection 86 can be connected to and extend away from the peripheral wall 74. The outlet projection 86 can include a concave surface that faces the second case member 70. The outlet projection 86 can have a semi-cylindrical shape.

Referring to FIGS. 4, 5, and 10, the second case member 70 can include a main wall 94, a peripheral wall 96, a first bearing, 98, a second bearing 100, a plurality of posts 106, a plurality of fastener holes 108, a mounting hole 110, a spring shelf 112 and an outlet projection 114.

The main wall 94 can oppose and be spaced away from the main wall 72 of the first case member 68. The peripheral wall 96 can project from the main wall 94 toward the second case member 70 and can surround the main wall 94. The peripheral wall 96 can be perpendicular or substantially perpendicular to the main wall 94 such that one skilled in the art would perceive the walls 94, 96 as being perpendicular to each other. The peripheral wall 96 can abut the peripheral wall 74 and the projections 82, 84 of the first case member 68.

The main wall 94 and the peripheral wall 96 can form a projecting wall 116 that extends toward the first case member 68. The projecting wall 116 can include a rear edge 118. The upper projection 82 of the first case member 68 can abut the rear edge 118.

The first bearing 98 can be connected to and extend from the main wall 94 of the second case member 70. The first bearing 98 can include a cylindrical projection and a concentric blind hole that terminates at the main wall 94. The first bearing 98 can support the wake actuator 60 as the wake actuator 60 moves between the first and second positions.

The first case member 68 can include a bearing that corresponds to the first bearing 98 of the second case member 70. The bearing is obstructed from view in FIG. 12 by the main wall 72.

The second bearing 100 can be connected to and extend from the main wall 94 of the second case member 70. The second bearing 100 can be aligned with the bearing 78 of the first case member 68. The second bearing 100 can include a hollow cylindrical projection that is closed at one end by the main wall 94. The second bearing 100 and the bearing 78 can rotationally support the cam member 62 as the blade brake actuator 22, 62 moves between the first and second positions.

The wake switch 50 can be mounted on and connected to the first case member in any appropriate manner such as but not limited to a mechanical fastener(s) staking, insert molding, adhesive, press-fit, snap connector(s), and/or any combination of these structures or methods for attachment.

Figure 14:
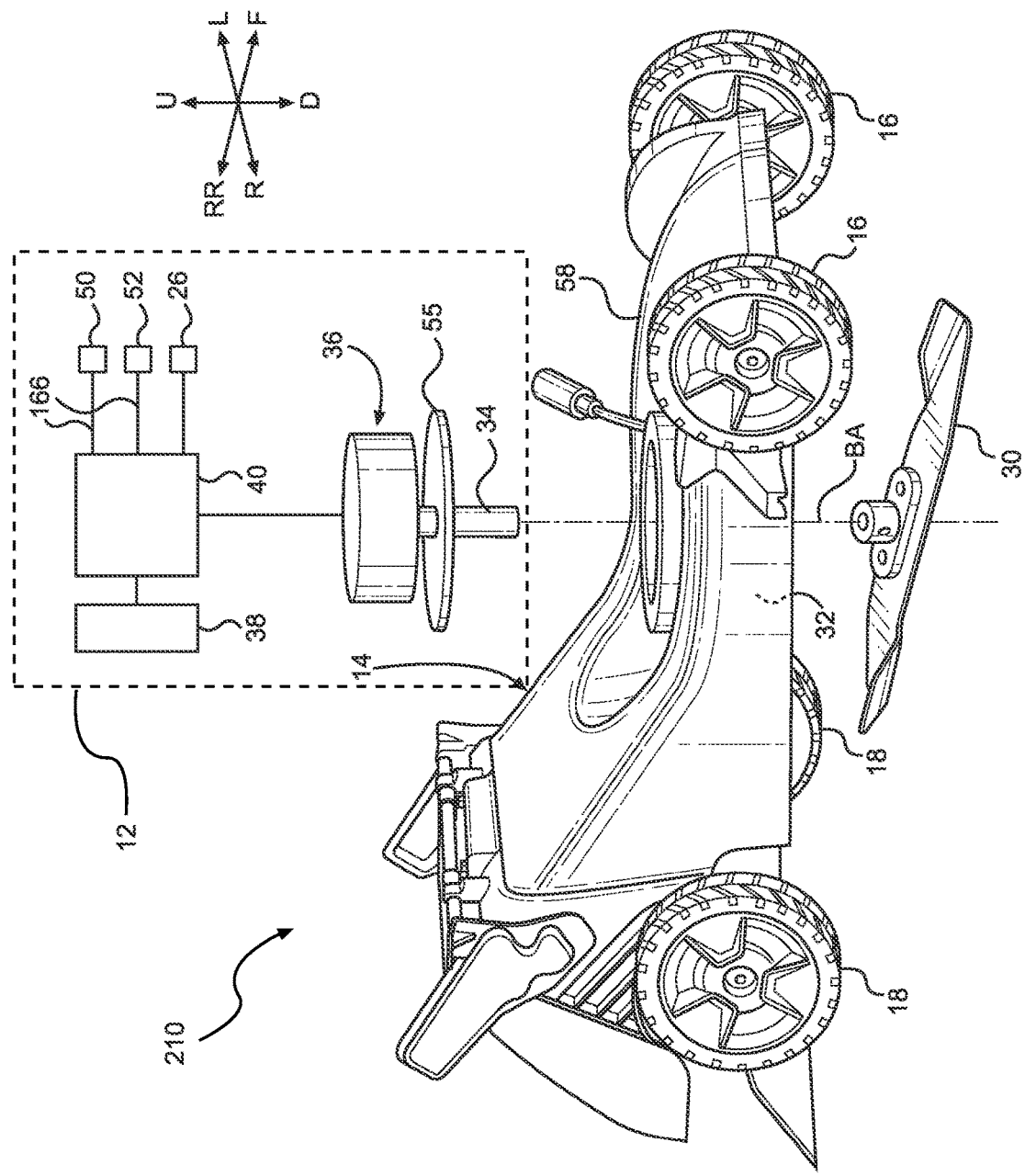
FIG. 14 is an exploded perspective view of a lawnmower and schematically illustrates a blade control system made in accordance with the principles of the disclosed subject matter.

The posts 106 can be connected to and extend away from the main wall 94. The posts 106 can extend toward and abut the main wall 72 of the first case member 68. The posts 106 can support the main walls 72, 94 such that the posts 106 limit deflection of the main walls 72, 94 toward each other. The posts 106 can support electrical wires 166 that are connected to the switches 50, 52. (The wires 166 are omitted from FIG. 10 for simplicity and clarity of the drawings, while the wires 166 are schematically illustrated in FIG. 14). The posts 106 can be hollow cylinders. However, the posts 106 can have any appropriate shape. Further, one or more of the posts 106 can have a unique shape.

The fastener holes 108 can pass through the main wall 94. The first housing member 68 can include a plurality of blind bores that are aligned with the fastener holes 108. (The blind bores are obscured from view in FIG. 10). The case 59 can include a plurality of fasteners 120 that each pass through a respective one of fastener holes 108 and are secured into a respective one of the blind bores in the first housing member 68 such that the fasteners 120 can connect the first housing member 68 to the second housing member 70. The fasteners 120 can be any appropriate fasteners such as but not limited to tapping screws, other threaded fasteners, snap-fit connectors, clips, or any combination.

The main wall 94 can include a concave external surface 122. The external surface 122 can abut the right extension 44 of the handle 20. The mounting hole 110 can pass through the main wall 94 and the concave surface 122. The mounting hole 110 can be aligned with the mounting hole 80 of the first case member 68. The mounting fastener 92 can pass through the mounting holes 80, 110 and the handle 20 and can be fixed to the case 59 and the handle 20. The mounting fastener 92 can be any appropriate structure such as but not limited to a bolt and nut, a clamp, a rivet, or any combinations thereof.

The spring shelf 112 can be connected to and extend from the main wall 94. The spring shelf 112 can support and retain the first coil spring 64 on the second case member 70. The first coil spring 64 can be fixed to the spring shelf 112 in any appropriate manner such as but not limited to staking, adhesive, a clamp, a latch, an interference fit, or any combinations thereof.

The outlet projection 114 can be connected to and extend away from the peripheral wall 96. The outlet projection 114 can include a concave surface that faces the first case member 68. The outlet projection 114 can have a semicylindrical shape. The outlet projection 114 can oppose the outlet projection 86 of the first case member 68. Together, the outlet projections 86, 114 can form an outlet through which the wires 166 connected to the switches 50, 52 can exit the case 59 and pass to the PDU 40 and the power supply 38.

The first coil spring 64 can bias the wake actuator 60 toward the first position in a direction away from the case 59. A user can push the wake actuator 60 toward the case 59 against the bias of the coil spring 64 such that the wake actuator 60 moves toward the spring shelf 112 and compresses the coil spring 64. The wake actuator 60 can be referred to as a push knob.

The wake actuator 60 can include a main body 124, a pivot shaft 126, a user surface 128, an engagement surface 130, and a flange 132.

The pivot shaft 126 can be connected to and extend from the main body 124 toward both of the main walls 72, 94. The pivot shaft 126 can be rotationally supported by the first bearing 98 of the second case member 70 and the corresponding bearing of the first case member 68. The main body 124 can pivot about a rotational axis of the pivot shaft 126 as the wake actuator 60 moves between the first and second positions.

The main body 124 can include the user surface 128 and the engagement surface 130. The user surface 128 can include a surface texture such as but not limited to knurls, raised bumps, ribs, or any combination that can enhance the frictional engagement between the user surface 128 and a user's bare hand or glove. The engagement surface 130 can be on a side of the main body 124 that is opposite to a side of the main body 124 on which the user surface 128 is located such that the engagement surface 130 is opposite to the user surface 128. The engagement surface 130 can abut the first coil spring 64 when the wake actuator 60 is in and moves between each of the first position and the second position.

The engagement surface 130 can be configured to selectively apply a force to the push button 162 via the lever 164 of the wake switch 50. When the wake actuator 60 is in the first position, the engagement surface 130 can be spaced away from the push button 162 such that the wake switch 50 connects the normally closed terminal 160 to the common terminal 156 and the PDU 40 receives a normal (OFF) signal from the wake switch 50. FIGS. 4 and 8 show the wake actuator 60 in the first position.

When a user moves the wake actuator 60 to the second position, the engagement surface 130 can apply a force to the push button 162 such that the wake switch 50 connects the normally opened terminal 158 to the common terminal 156 and the PDU 40 receives the wake (ON) signal from the wake switch 50. FIGS. 5 and 9 show the wake actuator 60 in the second position.

The flange 132 can be connected to and extend from the main body 124. The flange 132 can extend toward the first case member 68. The flange 132 can abut an inner surface of the peripheral wall 74 of the first case member 68 when the wake actuator 60 is in the first position. Thus, the flange 132 and the peripheral wall 74 can limit movement of the wake actuator 60 by the coil spring 64.

Referring to FIGS. 4 and 10 collectively, the shaft 134 can pass through the hole of the bearing 78 and project outside of the case 59. The bearings 78, 100 can rotatably support the cam member 62 when a user pivots the bail lever 22 to move the blade brake actuator 22, 62 from the first position to the second position and when the second coil spring 66 biases the blade brake actuator 22, 62 to move from the second position to the first position.

The blade brake actuator 22, 62 can include the bail lever 22, the cam member 62, the arm assembly 67, the second coil spring 66, and the dowel 69.

The second coil spring 66 can be mounted between the cam member 62 and the arm assembly 67. The second coil spring 66 can attach to the first seat 172 and the second seat 174 so that the second coil spring 66 is in a compressed state between the cam member 62 and the arm assembly 67 so as to exert a bias force on the blade brake actuator 22 towards its respective first position. The second coil spring 66 can bias the blade brake actuator 22 toward and into engagement with the end wall 88 of the lever stop 76.

The arm assembly 67 can be rotatably mounted to one of the plurality of posts 106 on the second case member 70 via a dowel 69. The dowel 69 can attach to the post 106 on one end and fix to the first case member 68 on an other end and can pass through an arm mounting hole 111 such that the arm assembly 67 can freely rotate about the dowel 69. The dowel 69 can be connected to either the first case member 68 and/or the second case member 70 in any appropriate manner such as but not limited to a mechanical fastener, adhesive, an interference fit, staking, or any combinations thereof.

The cam member 62 can include a slot 169 formed in the shaft 134. The right end 56 of the bail lever 22 can be inserted into and secured in the slot 169. The right end 56 can be connected to the cam member 62 in any appropriate manner such as but not limited to a mechanical fastener, adhesive, an interference fit, staking, or any combinations thereof.

Figure 11:
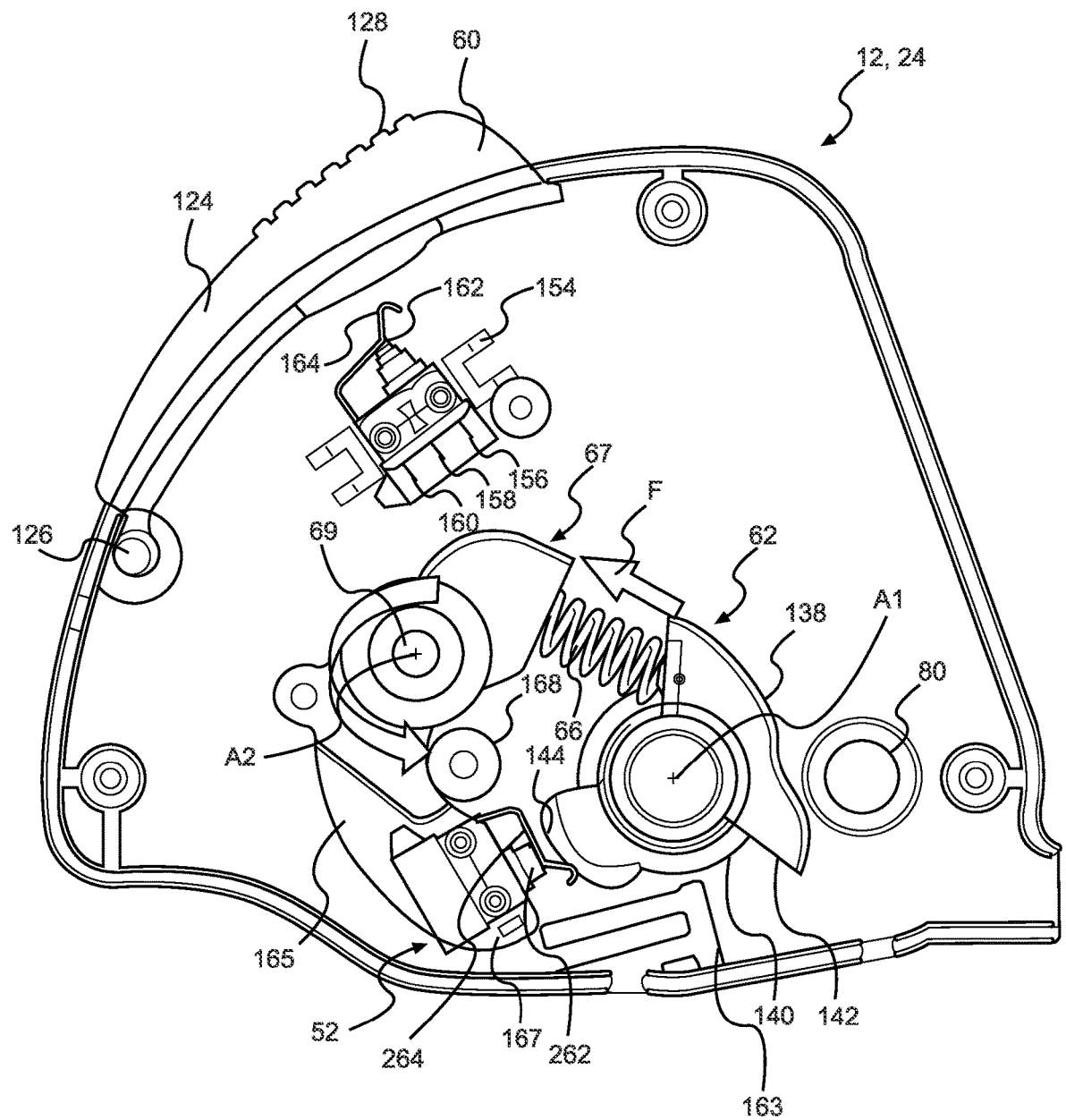
FIG. 11 shows the blade switch in the ON position when the blade control system of the lawnmower of FIG. 2 is in a normal state and the bail is in the second position.

Referring to FIG. 11 there is shown an illustration of the blade control system 12 in the normal state. In FIG. 11, the wake actuator 60 is in its first position and the blade brake actuator 22, 62 is in its second position. When the blade brake actuator 22, 62 is in its second position, the cam member 62 rotates such that the camming surface 144 contacts the lever 164 of the blade switch 52. In the normal state, the camming surface 144 presses the push button 162 causing the blade switch 52 to output the ON signal. When the blade brake actuator 22, 62 is in the second position, the arm assembly 67 rotates until it contacts the arm stop 168. The second coil spring 66 exerts a spring force F that causes a bias between the cam member 62 and the arm assembly 67 as illustrated in FIG. 11.

Figure 12:
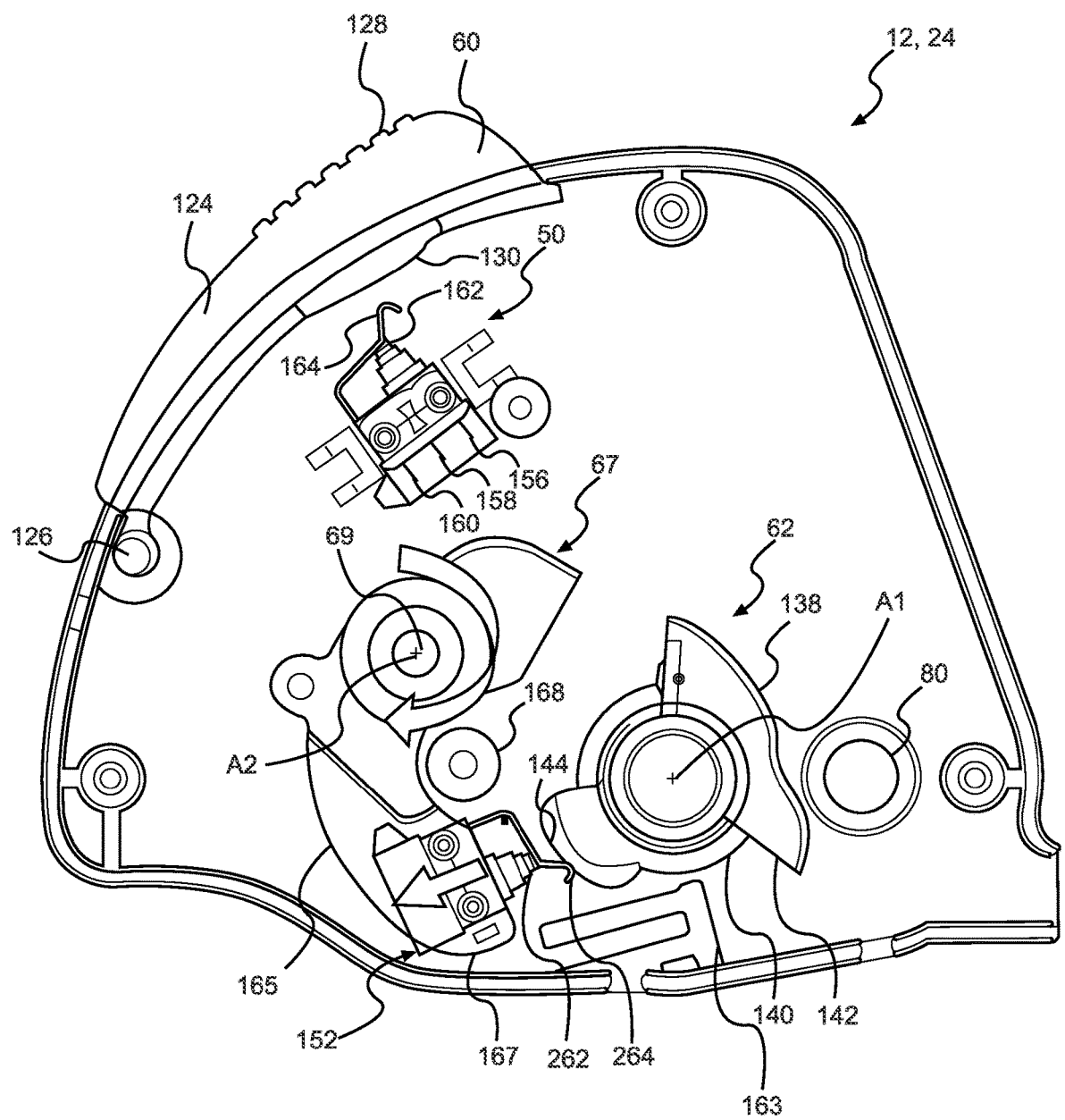
FIG. 12 shows the blade switch in the OFF position when the blade control system of the lawnmower of FIG. 2 is in an abnormal state and the bail is in the second position.

Referring to FIG. 12 there is shown an illustration of the blade control system 12 in the abnormal state. In FIG. 12, the wake actuator 60 is in its first position and the blade brake actuator 22, 62 is spaced away from its second position. That is, the arm assembly 67 is spaced away from the position that the arm is in as illustrated in FIG. 11 when the blade brake actuator 22, 62 is in its second position.

The abnormal state of the blade control system 12 can refer to a mechanical failure condition. For example, the abnormal state can be when the blade control system 12 experiences an absence of bias force between the arm assembly 67 and the cam member 62. The abnormal state can occur when the second coil spring 66 is broken, loose, misaligned, disconnected from either the first seat 172 and/or the second seat 174, or any other state of the second coil spring 66 such that the bias force F is absent. The abnormal state can refer to a state of the blade control system 12 when repair or service by a service provider is required.

When the blade control system 12 is in the abnormal state, the arm assembly 67 freely rotates about the dowel 69. Thus, if the camming surface 144 of the cam member 62 contacts the arm assembly 67, the arm assembly 67 rotates away from the cam member 62. That is, the spring force of the lever 264 is greater than the friction force (and/or inertia) of the arm assembly 67 about the dowel 69 and the force of the camming surface 144 being applied against the lever 264. As a result, the arm assembly 67 rotates away from the cam member 62 such that the push button 162 of the blade switch 52 will not be actuated in the abnormal state. Therefore, in the abnormal state, the blade switch 52 remains in the OFF signal.

Put differently, in the case of a mechanical failure of the blade control system 12, the blade switch 52 cannot be activated because there is no force holding the arm assembly 67 and blade switch 52 toward the cam member 62. If the cam member 62 comes into contact with the blade switch 52, in the abnormal state, the arm assembly 67 and blade switch 52 are pushed away without activation of the blade switch 52 which creates a "no run" condition.

Referring to FIGS. 11 and 12, each of the switches 50, 52 can include a switch housing 154, a common terminal 156, a normally opened terminal 158, a normally closed terminal 160 and push button 162. The common terminal 156 can provide an electrical input to the blade switch 52. The blade switch 52 can connect the normally closed terminal 160 to the common terminal 156 when the blade brake actuator 22, 62 does not input a force to the push button 162 of blade switch 52. Further, the wake switch 50 can connect the normally closed terminal 160 to the common terminal 156 when the wake actuator 60 does not input a force to the push button 162.

Figure 13:
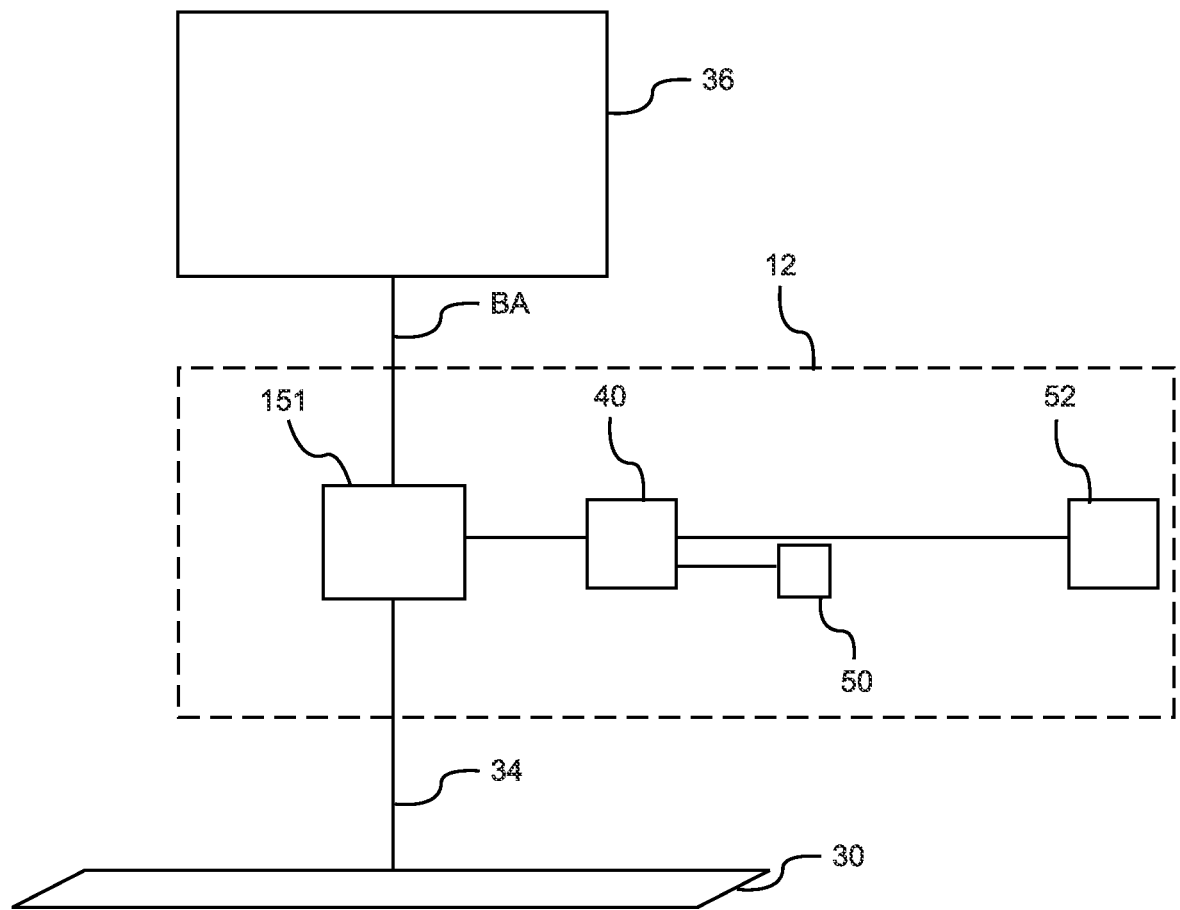
FIG. 13 is a schematic illustration of the blade control system of the lawnmower of FIG. 1.

FIG. 13 is a schematic illustration of a portion of the blade control system 12 with the power source 36 configured as an internal combustion engine. The power source 36 can be connected via a blade brake/clutch assembly 151 to the blade 30. The controller 40 can receive information from the blade switch 52 in order to actuate (or not actuate) the blade brake/clutch assembly 151.

Alternatively, the power source 36 can be configured as an electric motor and the lawnmower 10 can include a power supply 38 (also referred to as a battery). FIG. 14 schematically illustrates the embodiment of the lawnmower 10 with an electric motor as the power source 36, including the controller 40 (referred to as a PDU in the embodiment of FIG. 14 when configured to control the supply of electricity from the battery 38 to the electric motor 36) and the switches 50, 52. The power supply 38 can include one or more batteries. The PDU 40 can draw electricity from the power supply 38 during operation of the PDU 40.

Referring to FIG. 14, an embodiment of the lawnmower 210 with the power source 36 configured as an electric motor with a power supply 38 is shown with the handle 20 omitted for clarity and simplicity of the drawing.

The blade 30 can be mounted in the cutting chamber 32. A driveshaft 34 can be connected to each of the power source 36 and the blade 30. The power source 36 can be configured to rotate the drive shaft 34 and the blade 30 inside the cutting chamber 32.

The PDU 40 can be configured to execute a plurality of different tasks such as but not limited to controlling the supply of electricity from the power supply 38, monitoring the state of charge of the power supply 38, monitoring the state of health of the power supply 38, monitoring the operating temperature of the power source 36, monitoring the operating temperature of the power supply 38, displaying one or more messages to a user of the lawnmower 210 regarding the operational status of the lawnmower 210, etc.

In order to reduce the overall power drawn by the PDU 40 from the power supply 38, the PDU 40 can include a sleep mode and an operational mode. The PDU 40 can be configured to draw less power in the sleep mode than in the operational mode. The sleep mode can correspond to a state in which the lawnmower 210 is not in use and the operational mode can correspond to a state in which the lawnmower 210 is in use for its intended purpose(s), such as cutting grass and vegetation. In the operational mode, the PDU 40 can be configured to prioritize operational performance of the PDU 40 over the discharge rate of the power supply 38 by the PDU 40. In the sleep mode, the PDU 40 can be configured to prioritize the discharge rate of the power supply 38 by the PUD 40 over performance of the PDU 40.

In an exemplary embodiment, the PDU 40 can be configured to simultaneously execute a plurality of tasks in the operational mode and execute only one task at a time in sleep mode. In another exemplary embodiment, the PDU 40 can be configured to bypass one or more tasks that are not beneficial when the lawnmower 210 is not in use. In another exemplary embodiment, the PDU 40 can be configured to execute one or more tasks at a first predetermined time interval in the operational mode, and in the sleep mode execute one or more tasks at a second predetermined time interval that is less than the first predetermined time interval. Exemplary embodiments can include other appropriate variations between the sleep mode and the operation mode such that power consumption by the PDU 40 is less in the sleep mode than in the operational mode. Further details of the blade control system 12 will be described below.

The power supply 38 can be configured as a battery pack that includes one or more batteries contained in a module that can be selectively removed from and installed in the lawnmower 210 to facilitate charging of the battery(ies) by a charging unit that can be remote from the lawnmower 210. Alternate embodiments can include a power supply 38 configured as one or more batteries that are semi-permanently mounted inside the lawnmower 210 such that the battery(ies) are not routinely removed from the lawnmower 210 for charging. In this alternate embodiment, the lawnmower 10 can include a charging port that is configured to connect to supply of electrical current such as but not limited to a standard wall socket or a dedicated charging station.

In the embodiment illustrated in FIG. 14, the power source 36 can be a direct current motor or an alternating current motor. The power source 36 can be a direct current outer rotor motor that includes an inner stator and an outer rotor. The power source 36 can further include a mounting base 55. The inner stator can be supported by and fixed against rotation to the deck 14 and/or a fixed portion of a motor housing and/or the mounting base 55. The outer rotor can be supported to rotate relative to the inner stator and the mounting base 55. The mounting base 55 can be mounted on a top surface 58 of the deck 14 and connected to the deck 14 in any appropriate manner such as but not limited to mechanical fasteners. For example, the mounting base 55 can include a plurality of mounting holes spaced around the circumference of the mounting base 55. The mounting holes can include internal threads configured to engage external threads of a bolt that passes through a corresponding hole extending from the cutting chamber 32 and through the top surface 58 of the deck 14.

The PDU 40 can be in electrical communication with the power source 36 and configured to selectively activate and deactivate the power source 36 based on user inputs to the blade control system 12. The PDU 40 can be configured with hardware, with or without software, to perform the assigned task(s). The PDU 40 can include a processor that is in electrical communication with one or more memory devices such as but not limited to read-only member device or a random access memory device.

Electrical communication lines (not numbered) can connect the PDU 40 to the power source 36, switches 50, 52, controllers, sensors, and any other component configured for electrical communication in any appropriate manner. Electrical communication can be either one-way communication or two-way communication and can be networked or not networked.

Referring to FIG. 1, the lawnmower 10 can extend in a forward direction F, a rearward direction RR, a leftward direction L, a rightward direction R, a downward direction D and an upward direction U. The upward direction U and the downward direction D can be parallel to a blade rotational axis BA and can be opposite directions with respect to each other. The directions F, RR, and L, R, and U, D can be orthogonal to each other, respectively.

Alternative Embodiments

While certain embodiments of the invention are described above, it should be understood that the invention can be embodied and configured in many different ways without departing from the spirit and scope of the invention.

For example, embodiments are disclosed above in the context of a walk-behind lawnmower 10 shown in FIG. 1. However, alternate embodiments can include any type of lawnmower, such as but not limited to a riding lawnmower or a zero-turn-radius lawnmower. Further, exemplary embodiments of the lawnmower 10, 210 can be self-propelled via the power source 36 in any appropriate manner and controlled by the second input control assembly 26. Other exemplary embodiments can omit the self-propulsion system and omit the second input control assembly 26. However, the above alternative embodiments are merely provided for exemplary purposes, and as indicated above, embodiments include any type of lawnmower.

The switches 50, 52 can be any appropriate switch or sensor that is configured to provide the PDU 40 with respective signals so that the PDU 40 can differentiate between the first position of each of the wake actuator 60 and the blade brake actuator 22, 62 and the second position of each of the wake actuator 60 and the blade brake actuator 22, 62. In an exemplary embodiment, each of the switches 50, 52 can be configured as a sub-micro switch (also referred to as a micro switch or a snap-action switch). The wake switch 50 can be configured to output the normal (OFF) signal when the wake actuator 60 is spaced away from the wake switch 50 and the wake (ON) signal when wake actuator 50 applies an input force to the wake switch 50. The blade switch 52 can be configured to output the normal (OFF) signal when the blade brake actuator 22, 62 is spaced away from the wake switch 52 and the wake (ON) signal when blade brake actuator 22, 62 applies an input force to the wake switch 52. The switches 50, 52 can be identical to or substantially identical to each other.

In an exemplary embodiment, the wake switch 50 can include a lever 164 that is omitted from the blade switch 52 in FIGS. 8 and 9.

The PDU 40 can be configured to control the flow of electricity into each of the switches 50, 52 via the common terminal 156. The electricity input to the switches 50, 52 via the common terminal 156 can return to the PDU 40 via the connected one of the normally opened terminal 158 and the normally closed terminal 160.

The PDU 40 can be mounted in the motor housing of lawnmower 210. Wires (also referred to as a wire harness) can be connected to the PDU 40 and each of the terminals 156, 158, 160. The wires 166 can be routed along or inside the handle 20 as the wires 166 extend from the case 59 to the PDU 40.

The switches 50, 52 are described above as being sub-micro switches configured in a normally closed state. However, alternate embodiments can substitute one or both of the switches 50, 52 with any appropriate mechanical switch, electro-mechanical switch, electronic switch, electronic sensor, electro-mechanical sensor. Further, the wake switch 50 can be a different type of switch as compared to the blade brake switch 52.

The exemplary embodiments described above house the switches 50, 52 in the case 59. However, alternate embodiments can include a separate case for each switch and actuator combination. In a first alternate embodiment, each of the switches 50, 52 can be mounted on a respective one of the extensions 44, 46. In a second alternate embodiment, one of the switches 50, 52 can be mounted on the U-shaped portion 48 of the handle 20 and the other of the switches 50, 52 can be mounted on either one of the extensions 44, 46. Instead of the first input control assembly 24, alternate embodiments of the second input control assembly 26 can include the wake switch 52.

The exemplary embodiments disclosed above include actuators that pivot into and out of engagement with the switches. However, exemplary embodiments can include any type of motion for the actuators such as but not limited a sliding motion or a rotational motion.

Alternate embodiments can substitute the bail lever 22 and the cam member 62 with a duplicate of the wake actuator 60. Alternate embodiments can substitute the cam member 62 with a simple lever that is cantilevered to the right end 56 of the bail lever 22.

Alternate embodiments can include the wake actuator 60 and the wake switch 50 integrated onto the blade brake actuator 22, 62 such that the wake actuator 60 moves with the bail lever 22.

Alternate embodiments of the lawnmower can include more than one blade. Each blade can be driven by a common motor. Alternate embodiments can include a separate motor for each blade.

Alternate embodiments can include one or more memory devices integrated with the PDU 40.

In alternate embodiments the power source can include an internal combustion engine in addition to an electric motor.

The elastic member can be any appropriate elastic member including but not limited to a various types of springs such as coil springs, tension springs, compression springs, extension springs, flexible plastic, flexible metal, or any other appropriate member having elastic qualities that allow for elastic deformation.

The collection bag 28 can be in communication with a cutting chamber 32 of the deck 14 to collect vegetation that is cut by the blade 30. The collection bag 28 can be connected to at least one of the deck 14 and the handle 20. The collection bag 28 can be connected to the deck 14 at a side of the lawnmower 10 or at the rear of the lawnmower 10. In the exemplary embodiment of FIG. 1, the collection bag 28 is connected to the deck 14 at the rear of the lawnmower 10. The collection bag 28 can be removably mounted to the deck 14 in order to empty the cut vegetation from the collection bag 28. Alternatively, the lawnmower 10 can be operated without the collection bag 28.

What is claimed is:

1. A blade control system for a walk-behind lawnmower, the blade control system comprising:
a first actuator pivotably supported about a first axis and movable between a first position and a second position; and
an arm assembly pivotably supported about a second axis different than the first axis, the arm assembly including:
a switch disposed on the arm assembly and configured to selectively output a first ON signal and a first OFF signal, wherein
a biasing force acts on the first actuator and the arm assembly,
the first actuator is configured to pivot the arm assembly about the second axis in a first direction when the first actuator moves to the second position and the biasing force acts on the first actuator and the arm assembly, and
the first actuator is configured to pivot the arm assembly about the second axis in a direction opposite to the first direction when the first actuator moves to the second position in an absence of the biasing force.

2. The blade control system of claim 1, further comprising an elastic member configured to provide the biasing force acting on the first actuator and the arm assembly.

3. The blade control system of claim 2, wherein the elastic member is a coil spring having a first end attached to the arm assembly and a second end attached to the first actuator.

4. The blade control system of claim 3, wherein the coil spring is in compression between the arm assembly and the first actuator and exerts a force on the first actuator biasing the first actuator toward the first position.

5. The blade control system of claim 4, wherein the switch outputs the first OFF signal when either the first end of the coil spring is unattached from the arm assembly or the second end of the coil spring is unattached from the first actuator.

6. The blade control system of claim 2, further comprising:
a stop, wherein
the elastic member exerts a bias force on the arm assembly that biases the arm assembly to abut the stop, and
the the first actuator pushes the arm assembly away from the stop when the elastic member is disconnected from one of the arm assembly and the first actuator.

7. The blade control system of claim 6 wherein the elastic member exerts a bias force on the arm assembly toward the stop in the first direction about the second axis, and the the first actuator pushes the arm assembly in the second direction that is opposite the first rotational direction, when the elastic member is disconnected from the one of the arm assembly and the first actuator.

8. The blade control system of claim 1, further comprising:
a second actuator;
a second switch configured to selectively output a second ON signal and a second OFF signal.

9. The blade control system of claim 8, further comprising:
a casing having a first wall and a second wall;
a dowel connecting the first wall to the second wall, wherein
the first actuator, the second actuator, and the arm assembly are disposed between the first wall and the second wall, and the arm assembly is mounted on and rotatable about the dowel.

10. A lawnmower comprising:
a deck including a cutting chamber;
a power source;
a plurality of wheels supporting the deck;
a blade rotatably supported in the cutting chamber and selectively driven by the power source;
a blade control assembly including:
a first actuator having a lever and a cam, the first actuator pivotably supported about a first axis and movable between a first position and a second position; and
an arm assembly pivotably supported about a second axis different than the first axis, the arm assembly including:
a switch disposed on the arm assembly and configured to selectively output a first ON signal and a first OFF signal, wherein
an elastic member is configured to be connected to each of the first actuator and the arm assembly and is configured to provide a biasing force against both the first actuator and the arm assembly, and
the arm assembly is configured to pivot about the second axis in a direction opposite to a direction the cam pivots about the first axis when the cam moves to the second position in an absence of the biasing force from the elastic member.

11. The lawnmower of claim 10, wherein the blade control assembly includes,
a second switch configured to selectively output a second ON signal and a second OFF signal;
a controller in electrical communication with the first switch and the second switch,
the controller is configured to:
selectively transition between a sleep mode and an operational mode,
transition from the sleep mode to the operational mode when the controller receives the second ON signal,
cause the power source to transition from an idle state in which the blade is stopped to a driving state in which the power source rotationally drives the blade when the controller receives the first ON signal and the second ON signal,
continue causing the power source to drive the blade when the controller receives the first ON signal and the second OFF signal,
cause the power source to stop rotation of the blade and transition to the sleep mode when the controller receives the first OFF signal.

12. The lawnmower of claim 11, further comprising:
a handle connected to and extending away from the deck, wherein
the blade control assembly is mounted onto the handle.

13. The lawnmower of claim 10,
wherein the elastic member is connected to a portion of the first actuator that is located on a first side of the first axis, and the cam is located on a second side of the first axis that is opposed to the first side of the first axis, and
the elastic member is connected to a portion of the arm assembly that is located on a first side of the second axis, and the switch is located on a second portion of the arm assembly that is located on a second side of the second axis that is opposed to the first side of the second axis.

14. A blade control system for a walk-behind lawnmower, the blade control system comprising:
a first actuator having a cam, the first actuator pivotably supported about a first axis;
an arm assembly pivotably supported about a second axis different than the first axis, the arm assembly including:
a switch disposed on the arm assembly and configured to selectively output a first ON signal and a first OFF signal;
a spring that connects the first actuator to the arm assembly and, in a first state, exerts a bias force on the arm assembly in a first direction about the second axis, wherein
the arm assembly pivots about the second axis in a second direction different from the first direction and when, in a second state, there is an absence of the bias force from the spring, the cam contacts the arm assembly without causing the switch to output the ON signal.

15. The blade control system of claim 14, wherein the cam is pivotable about the first axis between a first position and a second position, and when in the first state the spring exerts the bias force on the cam towards the first position causing the switch to output the ON signal.

16. The blade control system of claim 15, wherein
the arm assembly is pivotably mounted on a dowel,
the arm assembly includes a lever having a second bias force disposed over the switch, and
the lever configured such that when in the second state, there is an absence of the bias force, and the second bias force causes the arm assembly to rotate away from the first actuator.

17. The blade control system of claim 16, wherein the first actuator includes a bail lever located adjacent a handle of the lawnmower, and the second position of the cam corresponds to a run position of the bail lever.

18. The blade control system of claim 15, wherein
the cam includes an abutment surface and a camming surface, and
the abutment surface abuts a stop, and the camming surface is spaced away from the switch in the first position, and
the abutment surface is spaced away from the stop, and the camming surface abuts the switch in the second position.

19. The blade control system of claim 18, wherein
the abutment surface is spaced away from the stop and the camming surface is spaced away from the switch in the second position when there is absence of the bias force.

20. The blade control system of claim 19, wherein
the spring is connected to a portion of the first actuator that is located on a first side of the first axis, and the cam is located on a second side of the first axis that is opposed to the first side of the first axis, and
the elastic member is connected to a portion of the arm assembly that is located on a first side of the second axis, and the switch is located on a second portion of the arm assembly that is located on a second side of the second axis that is opposed to the first side of the second axis.

* * * * *